June 7, 1966  G. W. KILPATRICK  3,255,358

AUXILIARY ALTERNATING CURRENT STRUCTURE

Filed June 25, 1962

INVENTOR
GEORGE Wayne Kilpatrick

United States Patent Office 3,255,358
Patented June 7, 1966

3,255,358
AUXILIARY ALTERNATING CURRENT STRUCTURE
George Wayne Kilpatrick, Greenwood, Mo.
(2007 W. Chipman Road, Lee's Summit, Mo.)
Substituted for abandoned application Ser. No. 70,721, Nov. 21, 1960. This application June 25, 1962, Ser. No. 205,019
3 Claims. (Cl. 307—64)

This application is a substitute for application Serial No. 70,721, filed November 21, 1960, now abandoned.

This invention relates to auxiliary, standby, emergency, substitute, or reserve electrical power systems and more particularly to auxiliary alternating current supply structures of the alternating current to direct current, and direct current to alternating current converter type circuits for use in automatically operating and switching an alternating current appliance such as a clock-radio back and forth between a main power source and an auxiliary power source in the event the main source is inoperative as during power failures, or is intermittently available as in a mobile home, boat, or part-time operation power system.

Auxiliary electrical power systems of the conventional type (such as described by Patent No. 2,868,996, issued on Jan. 13, 1959, to Harold E. McCord, have too many expensive components for small practical applications. Ways of combining and eliminating some of these components are desirable and are objects of the present invention.

It is therefore an object of the present invention to provide a simplified auxiliary alternating current supply structure employing a minimum number of multiple purpose components to convert alternating current from a main power source to direct current for storage and to convert the stored direct current to alternating current when needed for use in automatically continuing operation of an alternating current appliance in the event the main power source is inoperative or intermittent.

It is another object of this invention to provide auxiliary alternating current supply structure having a rechargeable battery which stores electrical energy for use during failure of the main alternating current supply source and which utilizes a single transformer for both battery charging and inverter operations.

It is still another object of the instant invention to provide auxiliary alternating current supply structure which employs electrical components that serve the dual purpose of rectifying the alternating current from the main source for charging the battery and serve also as electrical elements of the inverter network.

Other objects will become apparent as the detailed description proceeds.

Figure 1:
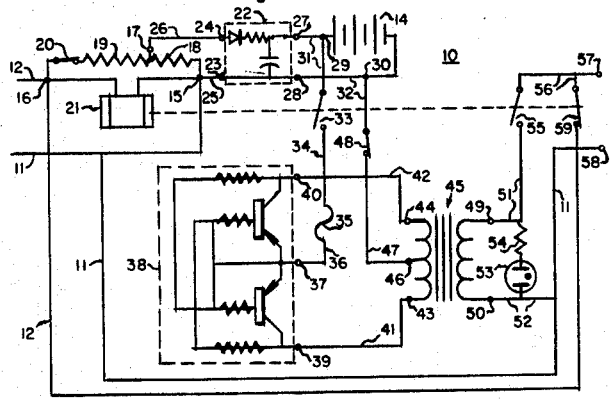
FIGURE 1 is an electrical schematic diagram showing an embodiment of the instant invention.

Referring to the drawing, an auxiliary alternating current structure 10 made in accordance with one embodiment of the present invention shown in FIG. 1 includes a pair of input wires 11 and 12 which are connected from a main A.C. power source to terminals 15 and 16 respectively. Terminals 15, 16, and 17 have connected to them voltage divider impedances 18 and 19 with terminals 15 and 17 as the low voltage output. The smaller impedance 18 is connected between 15 and 17, and the larger impedance 19 in series with a single action manual switch 20 is connected between 16 and 17. A relay coil 21 is also connected to terminals 15 and 16. Impedances 18 and 19 may be resistors for economy or a tapped inductor for less resistor power loss and a more constant voltage. A rectifier generally designated 22 has its input terminals 23 and 24 connected respectively with wires 25 and 26 to 15 and 17, and its output terminals 27 positive and 28 negative connected to respective terminals 29 and 30 of battery 14 by wires 31 and 32 respectively. Rectifier 22 may be of any conventional circuit type which prevents sizeable reverse leakage through impedance 18, and may include an on-off switch and appropriate filters and voltage and current limiters such as the resistive or inductive impedance-capacitor network shown.

Wire 31 is also connected to a single pole single throw (hereafter referred to as S.P.S.T.) relay switch 33 which is open when the relay coil 21 is energized. Switch 33 is connected to a wire 34 which is connected to a suitable fuse or circuit breaker 35. The latter is connected by a wire 36 to input terminal 37 of an inverter network 38, which has terminals 39 and 40 connected respectively to wires 41 and 42 which are, in turn, connected respectively to primary winding terminals 43 and 44 of an inverter step-up transformer 45. Transformer 45 together with network 38 comprises a complete D.C. to A.C. inverter with D.C. input terminals 37 and 46, terminal 46 representing a center tap to the primary winding of transformer 45. A wire 47 is connected between terminal 46 and a single action manual switch 48 which is conected to battery terminal 30 by wire 32. Various inverter networks 38 may be used ranging from mechanical vibrator types to electronic and semiconductor types of which some may require reversing the D.C. input wires 36 positive and 47 negative. The type of network 38 shown comprises two transistors and four resistors and has the advantage of not needing an expensive transformer with feedback windings as do some transistor inverters. Any more details are not considered necessary regarding network 38 as it is of a conventional type known to those skilled in the art.

Transformer 45 has secondary terminals 49 and 50 which are connected respectively to inverter output wires 51 and 52. Transformer 45 is of such a design with internal distributed capacitance and interwinding capacitance that when used with the proper network 38 for which it is designed the output voltage and frequency are controlled and the wave shape improved with a series resistor 54 and a neon bulb 53 connected between 51 and 52, said bulb when used with the properly designed transformer 45 serving as a combined transient voltage surge suppressor, waveshape and frequency output filter, and auxiliary operation indicator light. Oscilloscope traces of inverter output waveforms were studied using conventional inverter transformers with conventional inductor or capacitor output filters, and using conventional inverter transformers with the neon bulb 53, and using transformers such as 45 with the neon bulb 53. It was observed that the desired output voltage, frequency, and waveform achieved with conventional inverter transformers and output filters were not achieved with a conventional inverter transformer not properly matched with the neon bulb output filter; and that the desired output voltage, frequency, and wave form were achieved with fewer transformer windings and/or external filter components when a transformer designed such as 45 to operate with a neon bulb such as 53 was used, resulting in a more economical combination with the neon bulb operating also as an indicator light. The oscilloscope traces of the desired output mentioned above may be described by a sine or cosine wave of fairly constant voltage and frequency and are not shown. The output described above which did not have the desired characteristics differed only slightly in waveshape but more in frequency and voltage deviation for which an illustration is not necessary to those skilled in the art concerned with tolerance requirements of voltage and frequency for operating appliances such as those with timer motors.

Inverter output wire 51 is connected to a S.P.S.T. relay switch 55 which is open when the relay coil 21 is energized. Switch 55 is connected to a wire 56 which is connected to a terminal 57, said terminal along with another terminal 58 being the output terminals 57 and 58 of the structure previously designated 10, to which terminals may be connected any desired A.C. or A.C./D.C. appliance load. Terminal 58 is connected by wire 11 to the remaining inverter output wire 52. Wire 11 connects terminals 58 and 15. A S.P.S.T. relay switch 59 is connected between wire 56 and wire 12. Wire 12 connects terminal 16 to switch 59 which is closed when the relay coil 21 is energized. Switches 55 and 59 together may be a single pole double throw switch.

During normal operation of structure 10 as shown in FIG. 1 the main A.C. power source is operating through wires 11 and 12, and relay coil 21 is energized making a magnetomotive force that causes by usual relay means switches 33 and 55 to be open and switch 59 to be closed connecting wire 12 to terminal 57. Thus the load terminals 57 and 58 are supplied from the main power source while the inverter input is disconnected by switch 33 from the D.C. power stored at battery 14, and the inverter output is disconnected by switch 55 from the main power source protecting inverter components from the main power source and disconnecting the auxiliary operation indicator light 53 from the main power source. With manual switch 20 closed and the main power source operating, the battery 14 is charged from rectifier 22 supplied with the proper voltage by impedances 18 and 19. When the battery is fully charged power may be saved by opening switch 20.

When the main power source becomes inoperative relay coil 21 is de-energized and switches 33 and 55 are closed and switch 59 is opened by means such as springs as the magnetomotive force is no longer present to overcome said means. Switch 33 connects the inverter input circuit to the D.C. power stored at 14 and switch 55 connects the inverter output circuit to the load terminals 57 and 58 as the auxiliary operation indicator light comes on; and switch 59 disconnects the inverter output circuit from the main power source preventing loss of inverter A.C. output power to the main lines and keeping relay coil 21 from being energized. Thus with manual switch 48 closed the inverter converts D.C. to A.C. and operates within certain power limits any load connected between terminals 57 and 58. If during auxiliary operation auxiliary A.C. power is no longer needed, battery power may be saved by opening switch 48 or circuit breaker 35, if a circuit breaker with a manual switch is used for 35, which turns off the inverter.

When the main power source becomes operative relay coil 21 is again energized and switches 33, 55, and 59 return structure 10 to normal operation as described above, the indicator light is turned off, and the battery resumes charging if the switch 20 is closed. Switch 48 must be closed for automatic changeover to auxiliary operation.

Figure 2:
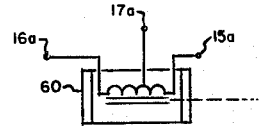
FIG. 2 is a schematic diagram showing a modification of the structure of FIG. 1.

A simplification of the circuit diagram of FIG. 1 may be had by substituting in place of 19, 18, and 21 a combined relay coil-step-down transformer 60 as shown in FIG. 2, like terminals being designated by the same reference numerals as in FIG. 1 with the letter "a" being added to those numerals in FIG. 2. The separate relay coil 21 and step-down transformer impedances 18 and 19 are thus replaced with a single component 60, the operation of the structure 10 remaining basically the same as previously described except that an A.C. power saving switch such as 20 in FIG. 1 must not be used where it could disconnect the relay coil 60 from terminals 15a, and 16a. Such a switch if desired might be used to disconnect terminal 17a from wire 26. Terminal 17a represents a connection to a tap of the relay coil 60 which provides the correct voltage for the rectifier 22 as did terminal 17 in FIG. 1.

Figure 3:
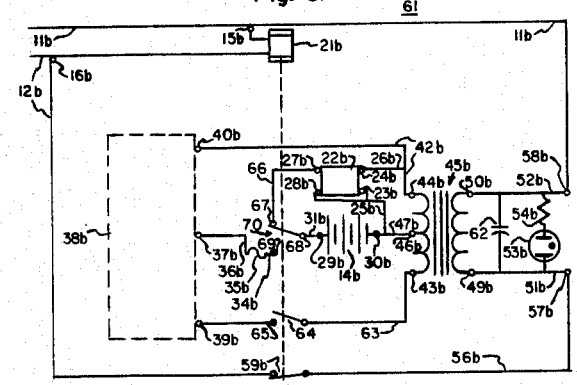
FIG. 3 is a schematic diagram showing another embodiment of the instant invention.

An auxiliary alternating current structure 61 made in accordance with another embodiment of the present invention is shown in FIG. 3. Components similar to those of FIG. 1 previously described are denoted by the same reference numerals with the letter "b" added. The structure 61 includes a pair of input wires 11b and 12b connected respectively from the main A.C. source to terminals 15b and 16b, and to load terminal 58b and S.P.S.T. relay switch 59b respectively. Switch 59b is connected by a wire 56b to load terminal 57b. A relay coil 21b is connected between terminals 15b and 16b and closes switch 59b when energized. A combined battery charger step-down transformer-inverter step-up transformer 45b is provided and distinguishes the FIG. 3 circuit over the structure of FIG. 1. Transformer 45b has primary terminals 43b, 44b, and center tap 46b; and secondary terminals 49b and 50b which are connected respectively to terminals 57b and 58b by wires 51b and 52b. Wires 51b and 52b have connected between them a resistor 54b in series with a neon bulb 53b. As in FIG. 1, the provision of a series resistor with the neon bulb allows use of a smaller, less expensive neon bulb. The neon bulb 53b is a combined indicator light-surge suppressor as in FIG. 1 except that it indicates only that power is being supplied to the load terminals and not that the power is derived solely from auxiliary operation as does 53 in FIG. 1. The light 53b can also be used in this case as a continuously operating night light or illuminator for dials such as those of a clock-radio. Also between transformer terminals 49b and 50b a condenser 62 may be connected if needed in the event that the dual purpose transformer 45b could not be designed with the proper capacitive characteristics. Connected to primary terminal 43b is a wire 63 which is connected to a S.P.S.T. relay switch 64 which is open when relay coil 21b is energized. Switch 64 is connected to inverter network terminal 39b by a wire 65. Inverter network 38b is identical in description to network 38 previously described and may have various other forms as may network 38. Primary terminal 46b is connected by a wire 47b to negative battery terminal 30b which is connected by a wire 25b to terminals 28b and 23b of a rectifier 22b of the same general type as rectifier 22 described previously. Primary terminal 44b is connected by a wire 42b to inverter terminal 40b. Wire 26b is connected between wire 42b and rectifier input terminal 24b. Rectifier positive output terminal 27b is connected by a wire 66 to a contact 67 of a single pole double throw, hereafter referred to as S.P.D.T., relay switch 70 which has alternate contacts 67 and 69, and common contact 68. Switch 70 is controlled by relay coil 21b, the common contact 68 being closed to contact 67 when coil 21b is energized and contact 68 being closed to contact 69 when coil 21b is de-energized. Contact 68 is connected by a wire 31b to positive battery terminal 29b. Contact 69 is connected by a wire 34b to a fuse or circuit breaker 35b which is connected by a wire 36b to inverter input terminal 37b.

During normal operation of structure 61 shown in FIG. 3 the load terminals 57b and 58b are supplied from a main source through wires 11b and 12b by way of switch 59b and wire 56b, and relay coil 21b is energized keeping switch 59b closed, switch 64 open, and switch 70 contacts 68 and 69 open. Thus, the circuits through network 38b are isolated from the remainder of the circuitry thereby protecting any fragile components, reducing losses, and preventing 35b from overload. Energized coil 21b also keeps switch 70 contacts 68 and 67 closed to complete the charging circuit between rectifier 22b, battery 14b, and terminals 44b and 46b of transformer 45b. The latter is used as a step-down transformer with terminals 49b and 50b as the input connected to the main A.C. power source at terminals 57b and 58b by wires 51b and 52b. When the battery is fully charged power may be saved by opening the circuit such as with a double plug and receptacle (not shown) between terminals 49b, 50b and 57b, 58b.

During auxiliary operation of structure 61 power from a main source is not available as is the case for auxiliary operation of other structures discussed herein. Relay coil 21b is de-energized opening contacts 67 and 68, closing contacts 68 and 69, closing switch 64, and opening switch 59b, by usual relay means such as springs. As a result inverter network 38b with transformer 45b used as a step-up inverter transformer is switched on by switches 64 and 70, and rectifier 22b is disconnected from the battery-inverter circuit. Switch 59b disconnects the auxiliary power output from the main power source in the same manner as switch 59 in FIG. 1. The load terminals 57b and 58b are supplied from the inverter output terminals 49b and 50b which if disconnected to save charging power during normal operation must be reconnected to obtain automatic changeover to auxiliary operation. If during auxiliary operation the inverter output power is no longer needed, the battery power may be saved by disconnecting the fuse or manually controlled circuit breaker 35b which turns off the inverter along with the indicator light 53b, said light, now off, serving as an indication of no power to terminals 57b and 58b. For automatic operation 35b must be reconnected or closed. When the main power source becomes operative structure 61 returns to normal operation as described above.

Figure 4:
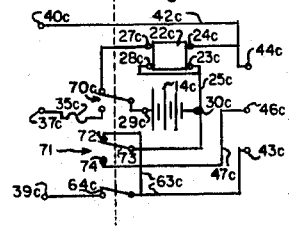
FIG. 4 is a schematic diagram illustrating a modification of the circuit of FIG. 3.

A different configuration of part of the circuit of FIG. 3 is shown in FIG. 4. Like reference numerals designate like components and terminals in the two figures, the letter "c" following the reference numerals of FIG. 4 being used to identify such common components and terminals. In FIG. 4 the entire primary winding between terminals 43c and 44c is used to supply the rectifier 22c instead of half of the winding as between terminals 44b and 46b in FIG. 3. An additional S.P.D.T. relay switch 71 also controlled by relay coil 21b is used in FIG. 4 with alternate switch contacts 72 and 74 connected respectively by wires 63c and 47c to terminals 43c and 46c, and with common switch contact 73 connected to battery terminal 30c by a wire 25c. The portion of the circuit diagram of FIG. 3 between terminals 40b, 44b, 46b, 43b, 39b, and 37b may be replaced by the partial circuit diagram of FIG. 4 between corresponding numerical terminals 40c, 44c, 46c, 43c, 39c, and 37c.

The operation of the structure 61 with the revisions of FIG. 4 is essentially the same as described for FIG. 3 except that during normal operation with the relay coil 21b energized, relay switch contacts 73 and 74 are open and contacts 72 and 73 are closed connecting wire 25c to wire 63c, and the battery charging circuit terminals 24c and 30c are connected across the entire primary winding represented by terminals 43c and 44c instead of across half the winding as to 44b and 46b in FIG. 3. During auxiliary operation with coil 21b de-energized, switch contacts 72 and 73 are open and contacts 73 and 74 are closed connecting wires 25c and 47c as wires 25b and 47b are connected in FIG. 3. The auxiliary operation is the same as described for FIG. 3.

Figure 5:
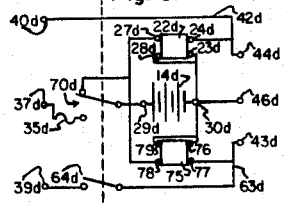
FIG. 5 is a schematic diagram showing another modification of the circuit of FIG. 3.

Yet another configuration of the same part of the circuit of FIG. 3 as replaced by that of FIG. 4 is shown in FIG. 5. In FIG. 5 winding terminals 43d, 46d, and 44d are used for supplying a conventional full wave rectifier from a center tapped winding. Designations for similar components of FIG. 3 and FIG. 5 have the same numerals with the letter "d" for FIG. 5 in place of "b" for FIG. 3. An additional rectifier network 75 is the main difference between FIG. 5 and FIG. 3. Rectifiers 22d and 75 are of identical types with the same optional filters or switches as may be used in rectifier network 22. Rectifier 75 has input terminals 76 and 77 and output terminals 78 positive and 79 negative corresponding respectively to rectifier 22d, terminals 23d, 24d, 27d, and 28d. Terminal 77 is connected to terminal 43d, terminal 78 is connected to terminal 27d, and terminals 76 and 79 are connected together with terminals 23d and 28d. Terminals of 22d and other components with corresponding numerals are connected the same way as those of FIG. 3. Thus the portion of the circuit of FIG. 5 between terminals 40d, 44d, 46d, 43d, 39d, and 37d may replace the portion of the circuit in FIG. 3 between terminals 40b, 44b, 46b, 43b, 39b, and 37b.

The operation of the new structure 61 with revisions of FIG. 5 is the same as described for FIG. 3 with relay switches 70d and 64d operating the same way as 70 and 64 in FIG. 3; except that during normal operation a full wave rectifier is used with center tapped winding instead of a half wave rectifier with half winding, and during auxiliary operation the dual purpose rectifiers 22d and 75 serve as an additional surge suppressor or voltage regulator as they are connected together like surge suppressor regulator diodes across the terminals 43d and 44d.

Figure 6:
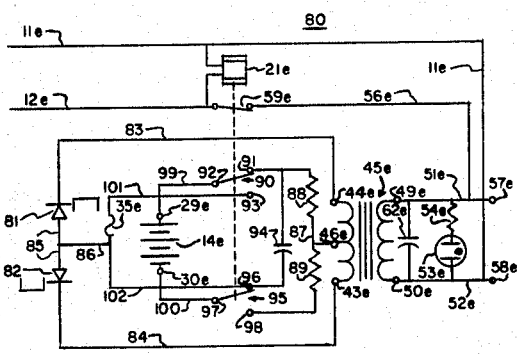
FIG. 6 is a schematic diagram of a further embodiment of the present invention.

An auxiliary alternating current structure 80 made in accordance with a further embodiment of the present invention is shown in FIG. 6. Components identical to those of FIG. 3 have the same reference numerals with the letter "e" added to associate them with FIG. 6. Transformer 45e serves alternately as a step down or charger and step up or inverter transformer in the same manner as 45 of FIG. 3. Additional dual purpose components are tunnel diodes 81 and 82 which serve alternately as charger rectifiers and inverter elements. The anodes of 81 and 82 are connected together by a wire 85 which connects to a wire 86. The cathodes of 81 and 82 are connected to transformer terminals 44e and 43e respectively by wires 83 and 84. Center tap terminal 46e is connected to a wire 87, one end of which is connected to a resistor 88 and the other end of which is connected to a resistor 89. Resistor 88 is connected to contact 91 of a S.P.D.T. relay switch 90 which has a common contact 92 and alternate contacts 91 and 93 and which is controlled by relay coil 21e. Contacts 91 and 92 are closed when 21e is energized and contacts 92 and 93 are closed when 21e is de-energized. A filter capacitor 94 may be connected between 91 and a contact 96 of S.P.D.T. relay switch 95 which has alternate contacts 96 and 98 and a common contact 97. Contacts 96 and 97 are closed when coil 21e is energized and contacts 97 and 98 are closed when coil 21e is de-energized. Contact 98 is connected to resistor 89. Contact 97 is connected by a wire 100 to negative terminal 30e of battery 14e, and contact 92 is connected by a wire 99 to positive battery terminal 29e. Contact 93 is connected by a wire 101 to fuse 35e which is connected to wire 86. Wire 86 is connected by a wire 102 to contact 96.

During normal operation of structure 80 as shown in FIG. 6 power is supplied by a main source to wires 11e and 12e. Relay coil 21e is energized, relay switch 59e is closed, and power is supplied to load terminals 57e and 58e by wires 56e and 11e. As in structure 61 with revision of FIG. 5, a center tapped transformer winding supplies full wave rectifiers to store D.C. power in a battery. In structure 80 tunnel diodes 81 and 82 are used for charger rectifiers with relay switches 90 and 95 in the positions shown connecting the the battery 14e into the charging circuit. Transformer 45e supplies power to 81 and 82 and the rectified power is filtered by 88 and 94 and passes respectively through closed contacts 91, 92 and 96, 97 to battery terminals 29e and 30e by way of wires 99 and 100. Contacts 92, 93 and 97, 98 are open.

During auxiliary operation of structure 80 relay coil 21e is de-energized, switch 59e like 59b in FIG. 3 is open, contacts 91, 92 and 96, 97 are open, and contacts 92, 93 and 97, 98 are closed connecting the battery 14e in the circuitry for operating 81 and 82 as inverter elements with 45e as inverter transformer. Resistors 88 and 89 are chosen for adjustment of voltages during respective normal and auxiliary operations. Auxiliary power is supplied by the inverter transformer output terminals 49e and 50e to wires 51e and 52e and to load terminals 57e and 58e respectively. It should be noted that the series connected components 53e and 54e between wires 51e and 52e may be interchanged in the series circuit. With the restoration of power from a main source to wires 11e and 12e relay coil 21e is energized and structure 80 returns to normal operation.

Figure 7:
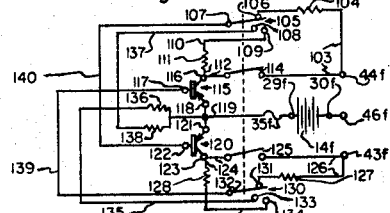
FIG. 7 is a schematic diagram showing a modification of the embodiment of FIG. 6.

A different configuration of part of the circuit of FIG. 6 is shown in FIG. 7. In FIG. 7 three-terminal semiconductor components such as transistors are employed instead of the two-terminal semiconductor components 81 and 82 of FIG. 6 for dual purpose rectifier-inverter elements. The portion of the circuit diagram of FIG. 6 with electrical connections to terminals 43e, 44e, and 46e may be replaced by the circuitry of FIG. 7 with electrical connections to corresponding terminals 43f, 44f, and 46f. Transformer terminal 44f is connected to a wire 103 which is connected to a resistor 104 which is, in turn, connected to a contact 106 of a relay switch 105. Switch 105 is also provided with contacts 107, 108, and 109 and is controlled by relay coil 21e. With 21e energized contacts 106 and 107 are closed, and contacts 108 and 109 are open and disconnected from other switch 105 contacts. With 21e de-energized contacts 106 and 107 are open and contacts 107, 108, and 109 are closed together. Contact 109 is connected to a wire 110 which is connected to a resistor 111 which is, in turn, connected to a wire 112. A S.P.S.T. relay switch 114 which is open when 21e is energized is connected between wire 112 and wire 103. A transistor 115 or a similar three-terminal semiconductor with p-n and n-p junctions has a collector terminal 116 connected to wire 112, a base terminal 117, and an emitter terminal 118. A wire 119 connects 118 to a fuse 35f which is connected to positive battery terminal 29f. Negative battery terminal 30f is connected to center-tap terminal 46f. Wire 119 is connected to an emitter terminal 121 of a transistor 120 which has a base terminal 122 and a collector terminal 123, the latter being connected to a wire 124. Transistor 120 is the same type of component as 115 such as a p-n-p transistor as shown. N-p-n transistors may be used for 115 and 120 by reversing the battery polarity. A S.P.S.T. relay switch 125 which is open when 21e is energized is connected between wire 124 and a wire 126 which is connected to transformer terminal 43f and to a resistor 127. Wire 124 connects terminal 123 to a resistor 128 which is connected to a wire 129. A relay switch 130 controlled by 21e has contacts 131, 132, 133, and 134. With 21e energized contacts 131 and 132 are closed, and contacts 133 and 134 are open and disconnected from other switch 130 contacts. With 21e de-energized contacts 131 and 132 are open and contacts 132, 133, and 134 are closed together. Resistor 127 is connected to contact 131. Wire 129 is connected to contact 134. A wire 135 is connected between contact 133 and a resistor 136 which is connected to wire 119. A wire 137 is connected between contact 108 and a resistor 138 which is connected to wire 119. A wire 139 is connected between terminal 117 and contact 132. A wire 140 is connected between terminal 122 and contact 107.

During normal operation as shown in FIG. 7, relay coil 21e is energized, switch 59e is closed, and power is supplied from a main source as in FIG. 6 to load terminals 57e and 58e and to other components connected thereto including transformer terminals 49e and 50e. Terminals 43f, 44f, and 46f of the center-tapped transformer winding supply a full wave rectifier pair comprising p-n rectifier junctions 121–122 and 118–117 respectively of components 120 and 115. Power flows from 44f through 103, 104, 106, 107, and 140 to 122 and 121, is rectified and flows through 119, 35f, 29f, 30f, and 46f completing the half-wave charging circuit through 44f and 46f. Power flows from 43f through 126, 127, 131, 132, and 139 to 117 and 118, is rectified and flows through 119, 35f, 29f, 30f, and 46f completing the other half-wave charging circuit through 43f and 46f. Thus battery 14f between terminals 29f and 30f is charged with a full-wave rectifier of the conventional center-tapped transformer type but with a unique circuit employing conventional semiconductors 115 and 120 for rectifiers.

During auxiliary operation of structure 80 with revisions of FIG. 7, relay coil 21e is de-energized with no power from a main source, and switch 59e is open. Contacts 107, 108, and 109 are closed, switches 114 and 125 are closed, and contacts 132, 133, and 134 are closed by usual relay means. As a result an inverter network is formed identical to network 38 of FIG. 1 with transistors 115 and 120 and resistors 111, 128, 136, and 138 connected as previously described to primary terminals 44f, 46f, and 43f of transformer 45e which is now used as an inverter transformer. The closed switches and contacts just described activate the inverter by completing battery and feedback circuits. Load terminals 57e and 58e are supplied with auxiliary power from the inverter as described for FIG. 6. Components 62e, 54e and 53e serve in the same manner as 62, 54b, and 53b in structure 61. With the restoration of power from a main source to wires 11e and 12e the structure returns to normal operation.

Figure 8:
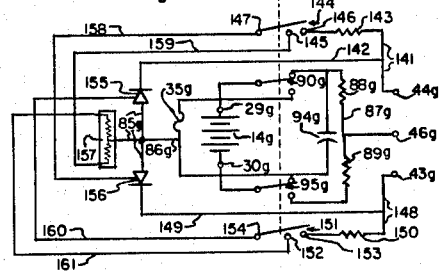
FIG. 8 is a schematic diagram showing an additional modification of the circuit shown in FIG. 6.

Yet another configuration of the same part of the circuit of FIG. 6 as replaced by that of FIG. 7 is shown in FIG. 8. The circuitry of FIG. 8 employs three-terminal semi-conductor components such as controlled rectifiers instead of components 81 and 82 of FIG. 6 for dual purpose rectifier-inverter components. The portion of the circuit diagram of FIG. 6 with electrical connections to terminals 43e, 44e, and 46e may be replaced by the circuitry of FIG. 8 with electrical connections to corresponding terminals 43g, 44g, and 46g. Transformer terminal 44g is connected to a wire 141 which is connected to a wire 142. A resistor 143 is connected between wire 141 and a contact 146 of a relay switch 144 which is also provided with contacts 145 and 147 and is controlled by relay coil 21e. With 21e energized contacts 145, 146, and 147 are open and disconnected from each other. With 21e de-energized contacts 145, 146, and 147 are closed together. Transformer terminal 43g is connected to a wire 148 which is connected to a wire 149. A resistor 150 is connected between wire 148 and a contact 153 of a relay switch 151 which is also provided with contacts 152 and 154 and is controlled by 21e. With 21e energized contacts 152, 153, and 154 are open and disconnected from each other. Center-tap terminal 46g and components with reference numerals 86g, 87g, 88g, 89g, 90g, 94g, 95g, 29g, 30g, 14g, and 35g have the same description and operation as the components with corresponding reference numerals in FIG. 6. The letter "g" used with the reference numerals associates corresponding components with FIG. 8. Controlled rectifiers 155 and 156 each have anode, cathode, and gate connections. A wire 85g is connected to wire 86g and connects together the anodes of controlled rectifiers 155 and 156 and connects to a common or center point of a network 157 which may contain feedback resistors and/or signal generators to supply the controlled rectifier gates with the proper multivibrator switching or gating signals through wires from two outer or end connection points of network 157. A wire 158 is connected between contact 147 and the gate of controlled rectifier 156. A wire 159 is connected between contact 145 and the lower connection point of network 157. A wire 160 is connected between contact 154 and the gate of controlled rectifier 155. A wire 161 is connected between contact 152 and the upper connection point of network 157. The cathodes of 155 and 156 are connected respectively to wires 142 and 149.

During normal operation as shown in FIG. 8, relay coil 21e is energized, switch 59e is closed, and power is supplied from a main source as in FIG. 6 to load terminals 57e and 58e and to other components connected thereto including transformer terminals 49e and 50e. Terminals 43g, 44g, and 46g of the center-tapped transformer winding supply a full wave rectifier made up of the anodes and cathodes of 155 and 156, the gates thereof being disconnected from network 157 and inverter circuits by open relay switches 144 and 151. Relay switches 90g and 95g connect battery 14g in the charging circuitry in the same manner as 90 and 95 in FIG. 6. Normal operation is much the same as described for FIG. 6 except for the use of 155 and 156 instead of 81 and 82 for charger rectifiers to store D.C. power in 14g.

During auxiliary operation of FIG. 8, relay coil 21e is de-energized with no power from a main source, and switch 59e is open. Contacts 145, 146, and 147 are closed, contacts 152, 153, and 154 are closed, and switches 90g and 95g connect the battery polarity for inverter operation in the same manner as 90 and 95 during auxiliary operation described for FIG. 6. As a result of these switching actions by usual relay means such as springs, an inverter network is formed similar to network 38 of FIG. 1 but with controlled rectifiers instead of transistors. Thus a D.C. to A.C. inverter operates and supplies load terminals 57e and 58e with auxiliary power. With the restoration of power from a main source to wires 11e and 12e the structure returns to normal operation under the control of energized relay coil 21e.

Various optional components may be used in place of the components described. In FIG. 2 the auto-transformer winding shown may be replaced by two separate transformer windings if appropriate changes are made in FIG. 1. The revised component 60 will then provide a safer isolated secondary winding for supplying the rectifier along with combined relay coil action. The transistors, controlled rectifiers, tunnel diodes, and other two or three terminal semiconductor components suitable for use in the circuits of FIGURES 1, 3, 6, 7, and 8 may be replaced by unijunction semiconductor componets with suitable characteristics, and the component pairs such as 115, 120 and 155, 156 will then be replaced by single unijunction components. Solid state relays or switches may replace the relays described with appropriate changes obvious to those skilled in the art industry. Automatic charging devices may be contained in the components with reference numeral 22 providing fast and slow charge rates as needed or as timed. All resistors described and/or with symbols shown in the drawing may be various types of two-terminal impedances such as inductors, capacitors, or combinations thereof. Any desirable meters or circuit protectors may be put in appropriate places. The semiconductor devices described herein may be replaced by their vacuum tube, electronic, mechanical, or vibrator counterparts or by combinations thereof.

It will now be recognized that the instant invention eliminates some of the cost, weight, and space formerly required for auxiliary power systems and makes more desirable portable power structures for small boats, mobile homes, and vehicles, in addition to making more economical a second power system for the home, more particularly for use with small continuously operated appliances such as clock-radios.

Although I have shown and described certain specific embodiments of my invention, I am fully aware that many modifications thereof are possible. My invention therefore is not to be restricted except insofar as is necessitated by the prior art and by the spirit of the appended claims.

What I claim as new and desire to protect by Letters Patent of the United States is:

1. Auxiliary alternating current power supply apparatus for use during failure of a main alternating current source, said apparatus comprising:
   a pair of load terminals adapted for coupling with an alternating current operated load;
   electrical conductor means adapted for coupling with said main source and coupled with said terminals for supplying alternating current electrical energy thereto when the main source is operative;
   transformer means including at least a pair of windings and means operably intercoupling said windings, one of the latter being coupled with said terminals;
   a rechargeable battery;
   circuit means intercoupling the other winding of said transformer means with said battery and having a pair of operational conditions, said circuit means in one of said conditions being operable to convert alternating current from said other winding into unidirectional current to charge said battery, and being operable in the other condition to convert direct current from said battery into a time-varying electrical current and excite said other winding with said time-varying current, said circuit means comprising an inverter network having a tunnel diode presenting at least a pair of electrical connection points between which substantial electrical current normally flows in only one direction, and circuitry coupling said tunnel diode with said other winding to present a rectifier stage for charging said battery; and
   control means coupled with said circuit means and responsive to alternating current electrical energy from said main source for maintaining said circuit means in said one condition, during operation of said main source, and placing said circuit means in said other condition upon failure of the main source, whereby said load is continuously supplied with electrical energy, said control means including switching means coupled with said network and said circuitry for rendering the latter operative during operation of said main source, and for rendering the network operative upon failure of the main source.

2. Auxiliary alternating current power supply apparatus for use during failure of a main alternating current source, said apparatus comprising:
   a pair of load terminals adapted for coupling with an alternating current operated load;
   electrical conductor means adapted for coupling with said main source and coupled with said terminals for supplying alternating current electrical energy thereto when the main source is operative;
   transformer means including at least a pair of windings and means operably intercoupling said windings, one of the latter being coupled with said terminals;
   a rechargeable battery;
   circiut means intercoupling the other winding of said transformer means with said battery and having a pair of operational conditions, said circuit means in one of said conditions being operable to convert alternating current from said other winding into unidirectional current to charge said battery, and being operable in the other condition to convert direct current from said battery into a time-varying electrical current and excite said other winding with said time-varying current, said circuit means comprising an inverter network having a transistor presenting at least a pair of electrical connnection points between which substantial electrical current normally flows in only one direction, and circuitry coupling said transistor with said other winding to present a rectifier stage for charging said battery; and control means coupled with said circuit means and responsive to alternating current electrical energy from said main source for maintaining said circuit means in said one condition, during operation of said main source, and placing said circuit means in said other condition upon failure of the main source, whereby said load is continuously supplied with electrical energy, said control means including switching means coupled with said network and said circuitry for rendering the latter operative during operation of said main source, and for rendering the network operative upon failure of the main source.

3. Auxiliary alternating current power supply apparatus for use during failure of a main alternating current source, said apparatus comprising:

a pair of load terminals adapted for coupling with an alternating current operated load;

electrical conductor means adapted for coupling with said main source and coupled with said terminals for supplying alternating current electrical energy thereto when the main source is operative;

transformer means including at least a pair of windings and means operably intercoupling said windings, one of the latter being coupled with said terminals;

a rechargeable battery;

circuit means intercoupling the other winding of said transformer means with said battery and having a pair of operational conditions, said circuit means in one of said conditions being operable to convert alternating current from said other winding into unidirectional current to charge said battery, and being operable in the other condition to convert direct current from said battery into a time-varying electrical current and excite said other winding with said time-varying current, said circuit means comprising an inverter network having a controlled rectifier presenting at least a pair of electrical connection points between which substantial electrical current normally flows in only one direction, and circuitry coupling said controlled rectifier with said other winding to present a rectifier stage for charging said battery; and control means coupled with said circuit means and responsive to alternating current electrical energy from said main source for maintaining said circuit means in said one condition, during operation of said main source, and placing said circuit means in said other condition upon failure of the main source, whereby said load is continuously supplied with electrical energy, said control means including switching means coupled with said network and said circuitry for rendering the latter operative during operation of said main source, and for rendering the network operative upon failure of the main source.

References Cited by the Examiner

UNITED STATES PATENTS

| | | | |
|---|---|---|---|
| 1,866,147 | 7/1932 | Aylsworth | 317—181 |
| 1,951,482 | 3/1934 | Holden | 307—64 |
| 2,263,320 | 11/1941 | Trucksees | 307—64 |
| 2,501,263 | 3/1950 | Cherry | 323—17 X |
| 2,518,394 | 8/1950 | Spencer | 307—64 |
| 2,527,220 | 10/1950 | Hughes | 317—181 |
| 2,830,252 | 4/1958 | Amey | 323—17 X |
| 2,868,996 | 1/1959 | McCord | 307—64 |
| 3,119,057 | 1/1964 | Wilson | 321—18 X |

LLOYD McCOLLUM, *Primary Examiner.*

MILTON O. HIRSHFIELD, MAX L. LEVY, *Examiners.*

L. R. CASSETT, T. J. MADDEN,
*Assistant Examiners.*